(12) United States Patent
Tien

(10) Patent No.: US 6,338,256 B1
(45) Date of Patent: Jan. 15, 2002

(54) HIGH EFFICIENCY COOLING DEVICE IN A COOLING MECHANISM

(75) Inventor: Chang-Wen Tien, Hsin Chu Hsien (TW)

(73) Assignee: Taiwan Fluorescent Lamp Co., Ltd., Taipei (TW)

( * ) Notice: Subject to any disclaimer, the term of this patent is extended or adjusted under 35 U.S.C. 154(b) by 0 days.

(21) Appl. No.: 09/631,822

(22) Filed: Aug. 3, 2000

(30) Foreign Application Priority Data

Oct. 8, 1999 (TW) ....................................... 88217114 U

(51) Int. Cl.⁷ ............................................... F28D 5/00
(52) U.S. Cl. ........................................... 62/305; 62/114
(58) Field of Search ........................... 62/305, 114, 304, 62/314, 193, 506

(56) References Cited

U.S. PATENT DOCUMENTS 3,908,393 A * 9/1975 Eubank ....................... 62/305
4,603,559 A * 8/1986 Wu ........................... 62/305 X
5,701,748 A * 12/1997 Phelps et al. ............. 62/305 X
5,992,171 A * 11/1999 Bacchus ....................... 62/305

* cited by examiner

Primary Examiner—Henry Bennett
Assistant Examiner—Chen-Wen Jiang
(74) Attorney, Agent, or Firm—Rosenberg, Klein & Lee

(57) ABSTRACT

A high efficiency cooling device in a cooling mechanism comprises a heat exchange unit 20, a gas cooling unit 21, a water cooling unit 22 and a water circulation unit 23. The heat exchange unit is an upright round frame formed of a plurality of upright heat radiating fins and refrigerant tubes which are densely wound around these heat radiating fins. The round frame is enclosed with a hollow chamber. A water cooling unit is installed in the hollow chamber of the heat exchange unit. The water cooling unit mainly includes least one spray disk driven by a motor or other dynamic device and a first water supply tube for supplying cooling water to the spray disk. Thereby, cooling water will uniformly spray to each heat exchange unit due to the inertial force of rotation itself, then flows downwards straightly along the heat radiating fin so as to achieve a high efficiency cooling effect.

13 Claims, 7 Drawing Sheets

HIGH EFFICIENCY COOLING DEVICE IN A COOLING MECHANISM

FIELD OF THE INVENTION

The present invention relates to a cooling device which is especially used in cooling mechanisms, such as air conditioner, and specially water cooling or gas cooling way are used for high efficient heat exchange.

BACKGROUND OF THE INVENTION

As shown in FIG. 9, a conventional cooling device 1 with the water cooling and gas cooling functions. In this prior art, the cooling device is wound by continuous refrigerant tubes 10. A water supply pipe is arranged above the refrigerant tube 10. The water supply tube 11 is installed with spray 110 for spraying cooling water to the refrigerant tube 10 for absorbing the heat of the condensed gas refrigerant and reduce the temperature. The cooling water after heat exchanged is collected by the water collecting disk 1 at the bottom. Then the cooled water is pumped by the water pump 13 to the water supply tube 11 for recycling. By the potential heat from the vaporized water and the convection from contact between water and refrigerant tube 10 to attain the effect of cooling. A float ball switch 14 is installed in the water collecting disk 12 for supplying with cooling water at a proper time. Besides, in order to enhance the cooling efficiency, an heat dissipating fan 15 is added for enforcing the airflow to flow between the refrigerant tube so as to carry the vapor and cooling water away from the refrigerant tubes. Therefore, the device uses the water cooling and gas cooling ways for cooling, a preferred cooling effect than those only use one of the water cooling or gas cooling way is achieved.

However, in this cooling device 1, since the spraying means is only installed above a machine and sprays water downwards. Moreover, the spraying is only in some points or some determined directions. Therefore, only the several uppermost layers of the refrigerant tubes can be sprayed densely. Further, only some specific refrigerant tubes can be directly sprayed. The refrigerant tubes at the middle or lower layers are only sprayed with insufficient water, even only the water dropped from the upper layers is fallen to these refrigerant tubes. That is, as a whole, the cooling area is not uniform, and therefore, the refrigerant can not be cooled continuously and completely. Therefore, the cooling efficiency can not be improved effectively and a large amount of energy is necessary.

Accordingly, there is an eager demand for a novel high efficiency cooling device used in a cooling mechanism which can improved the defect in the prior art design.

SUMMARY OF THE INVENTION

Accordingly, the primary object of the present invention is to provide a high efficiency cooling device in a cooling mechanism which substantially improves the cooling efficiency and reducing power supply. A special water cooling spray disk is installed. In the present invention, the heat exchange unit formed by the refrigerant tubes and heat radiating fins are installed uprightly and is enclosed as a hollow chamber. A spray disk rotated continuously is installed in the chamber so that the cooling water falls to the spray disk can be sprayed uniformly to the periphery of the heat exchange unit by the inertial force thereof and then flow down.

The various objects and advantages of the present invention will be more readily understood from the following detailed description when reading in conjunction with the appended drawing.

DETAILED DESCRIPTION OF THE PREFERRED EMBODIMENTS

Figure 1:
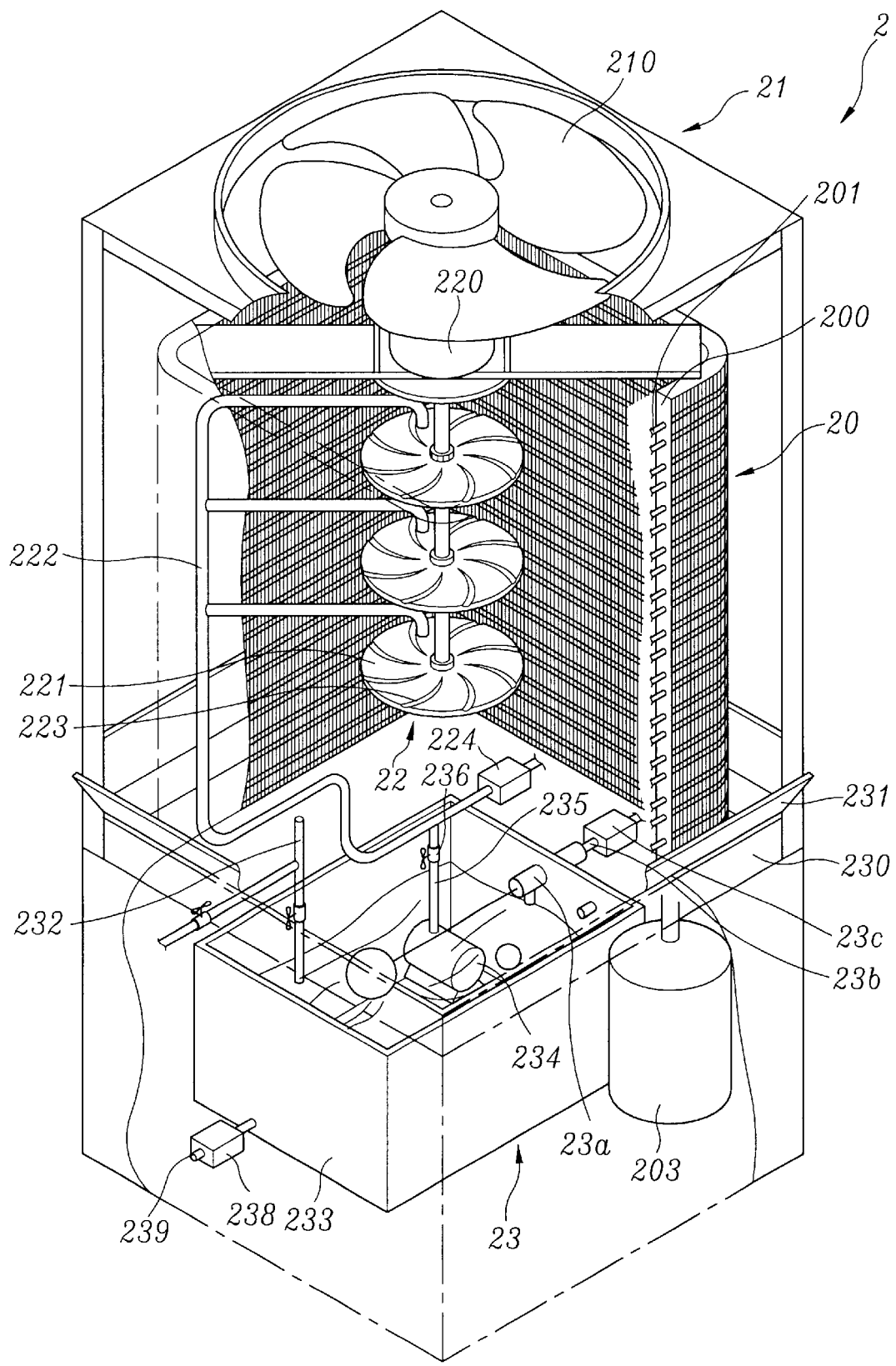
FIG. 1 is a structural schematic view of the present invention.
Figure 2:
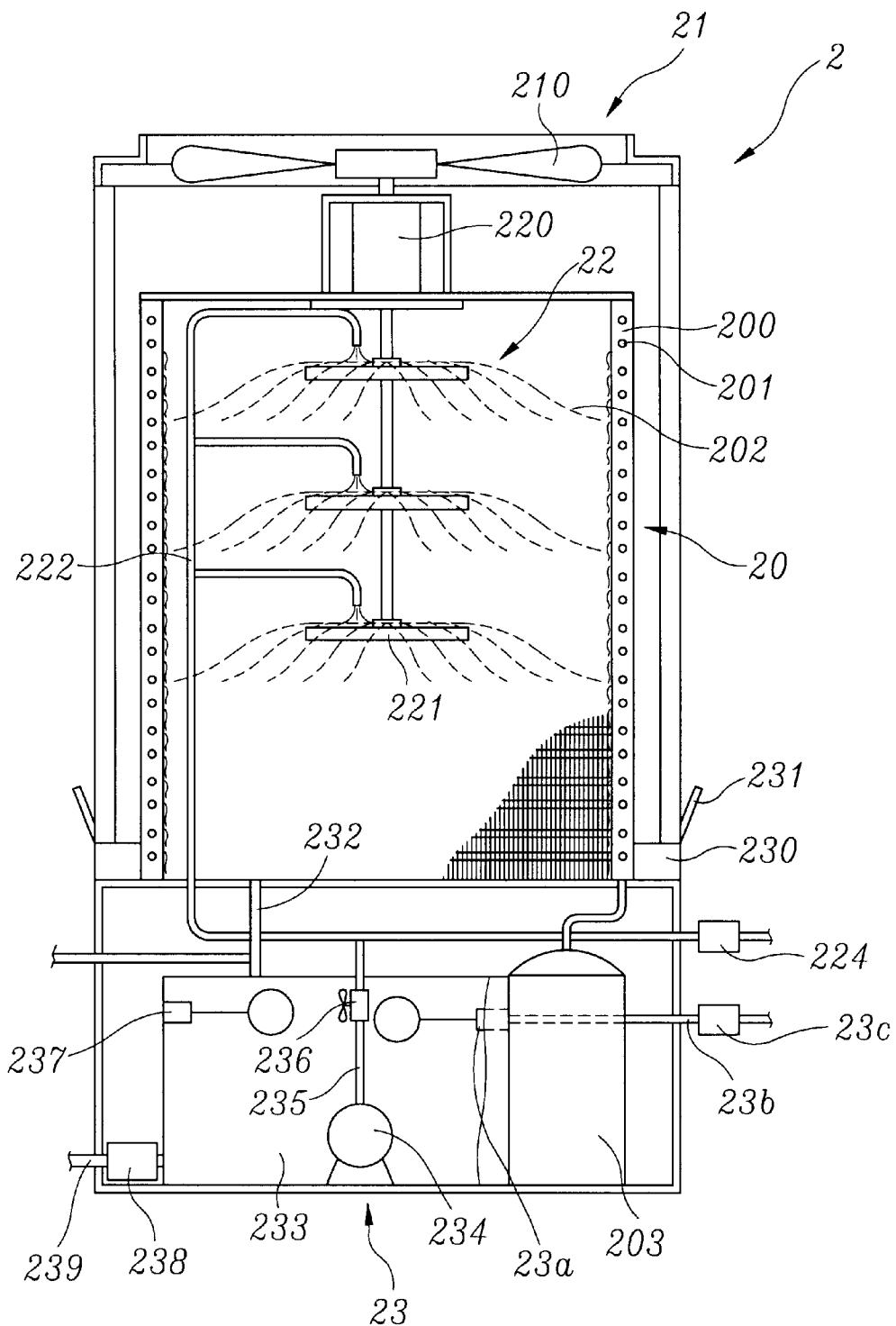
FIG. 2 is a structure schematic view of the spray disk in the present invention.

With reference to FIGS. 1 and 2, a perspective view and a cross sectional view of the preferred embodiment of the high efficiency cooling device in a cooling mechanism according to the present invention is illustrated. In the present invention, the cooling mechanism may be an air conditioner, a refrigerator, a cold storage device, or other devices for reducing temperature. The cooling device 2 includes a heat exchange unit 20, a gas cooling unit 21, a water cooling unit 22 and a water circulation unit 23.

The heat exchange unit 20 is an upright round frame formed of a plurality of upright heat radiating fins 200 and refrigerant tubes 201 which are densely wound around these heat radiating fins 200. The round frame is formed with a hollow chamber 202. The refrigerant tubes 201 of the heat exchange unit 20 is connected to an air compressor 203 and an evaporator (not shown) so as to form as a refrigerant circular system. Heat transferring dielectric refrigerant is filled in the refrigerant tubes 201, and the heat of the refrigerant is absorbed by the evaporator to become gas refrigerant, which is then driven and circularly flows, and then enters into the heat exchange unit 20. Whereby, the heat of the refrigerant is released so as to decrease the temperature thereof so as to be condensed to become liquid refrigerant.

The gas cooling unit 21 is installed above the hollow chamber 202 of the heat exchange unit 200. The gas cooling unit 21 may include a heat dissipating fan 210 or eccentric wind wheel. Thereby, the air flow blows laterally and outwards will reduced the temperature around each heat radiating fin 100 of the heat exchange unit 200 by heat exchanging with the refrigerant tubes 201.

Figure 3:
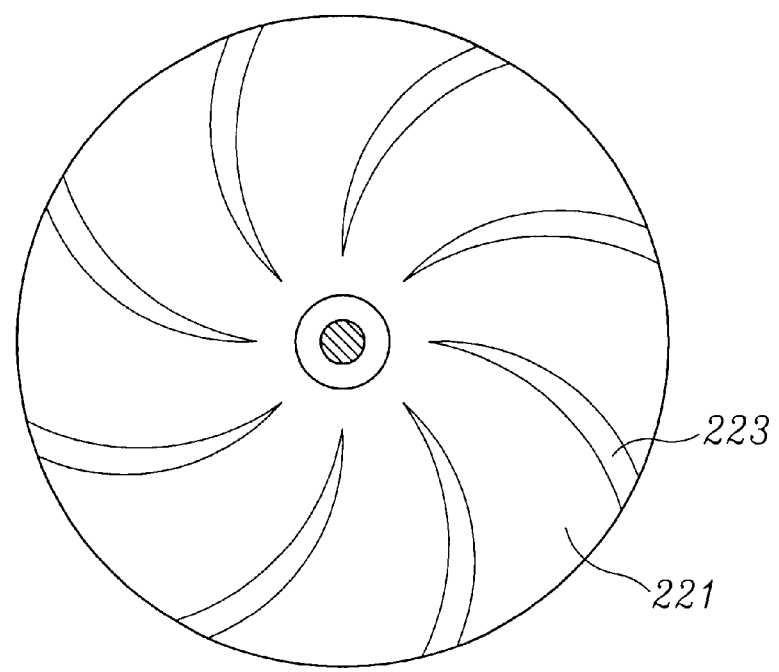
FIG. 3 is a plane view showing the spray disk structure of the present invention.
Figure 4:
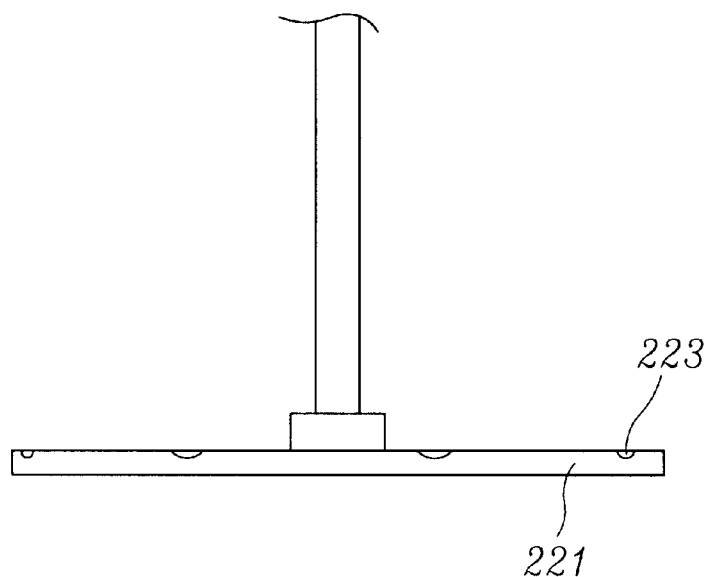
FIG. 4 is a lateral plane view of the spray disk structure in the present invention.
Figure 6:
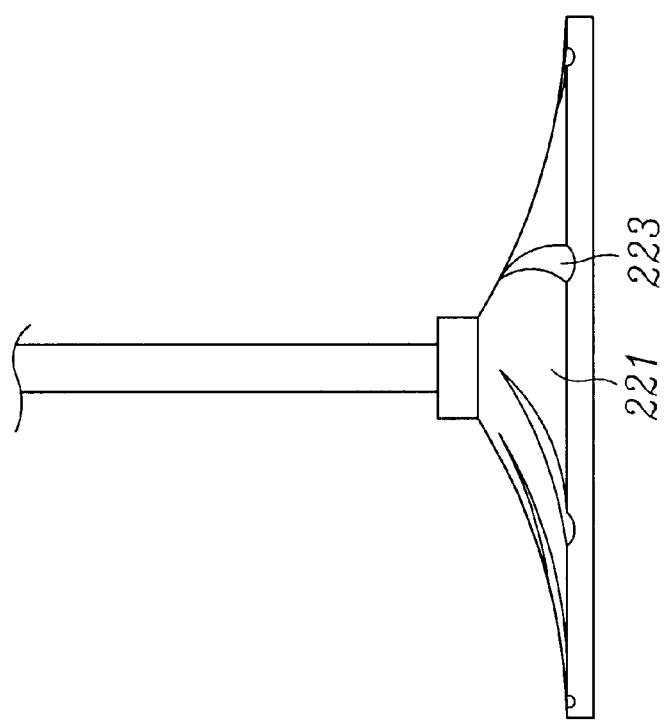
FIG. 6 is a lateral plane view of another embodiment n the spray disk structure in the present invention.
Figure 5:
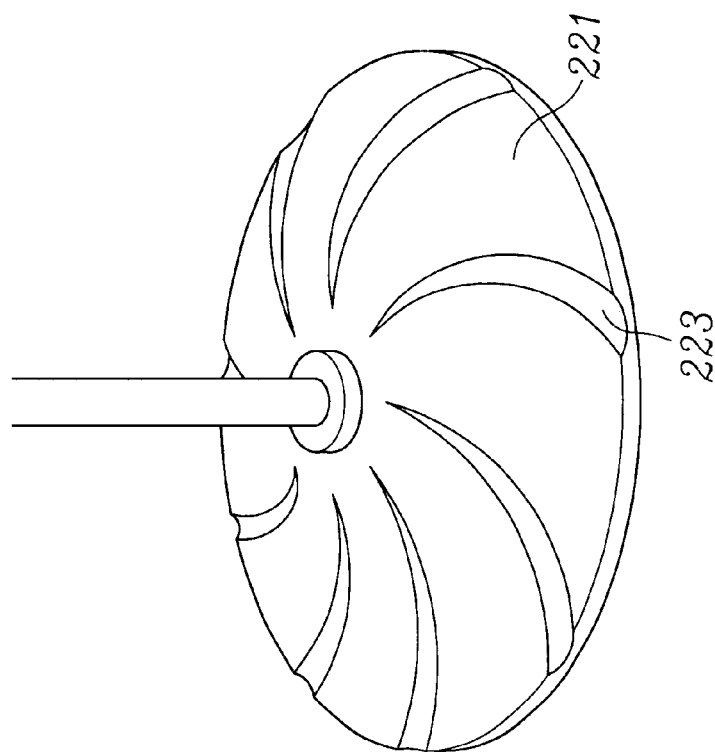
FIG. 5 is a perspective view showing another embodiment of the spray disk structure in the present invention.
Figure 7:
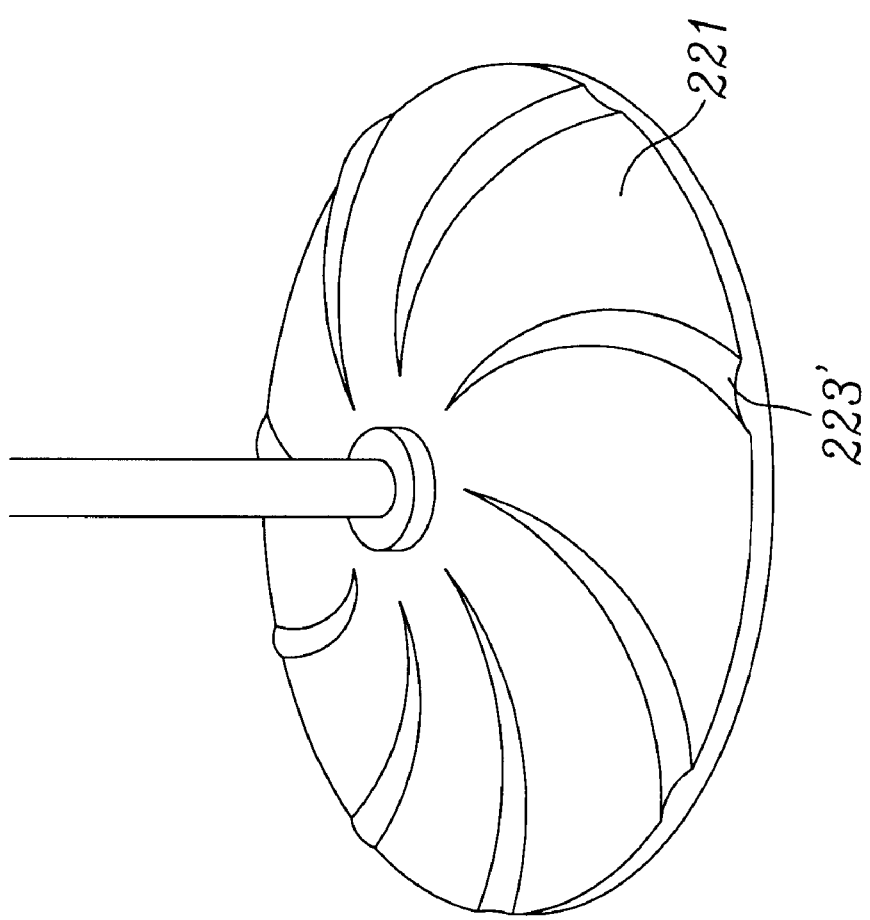
FIG. 7 is a perspective view showing a further embodiment of the spray disk structure in the present invention.
Figure 8:
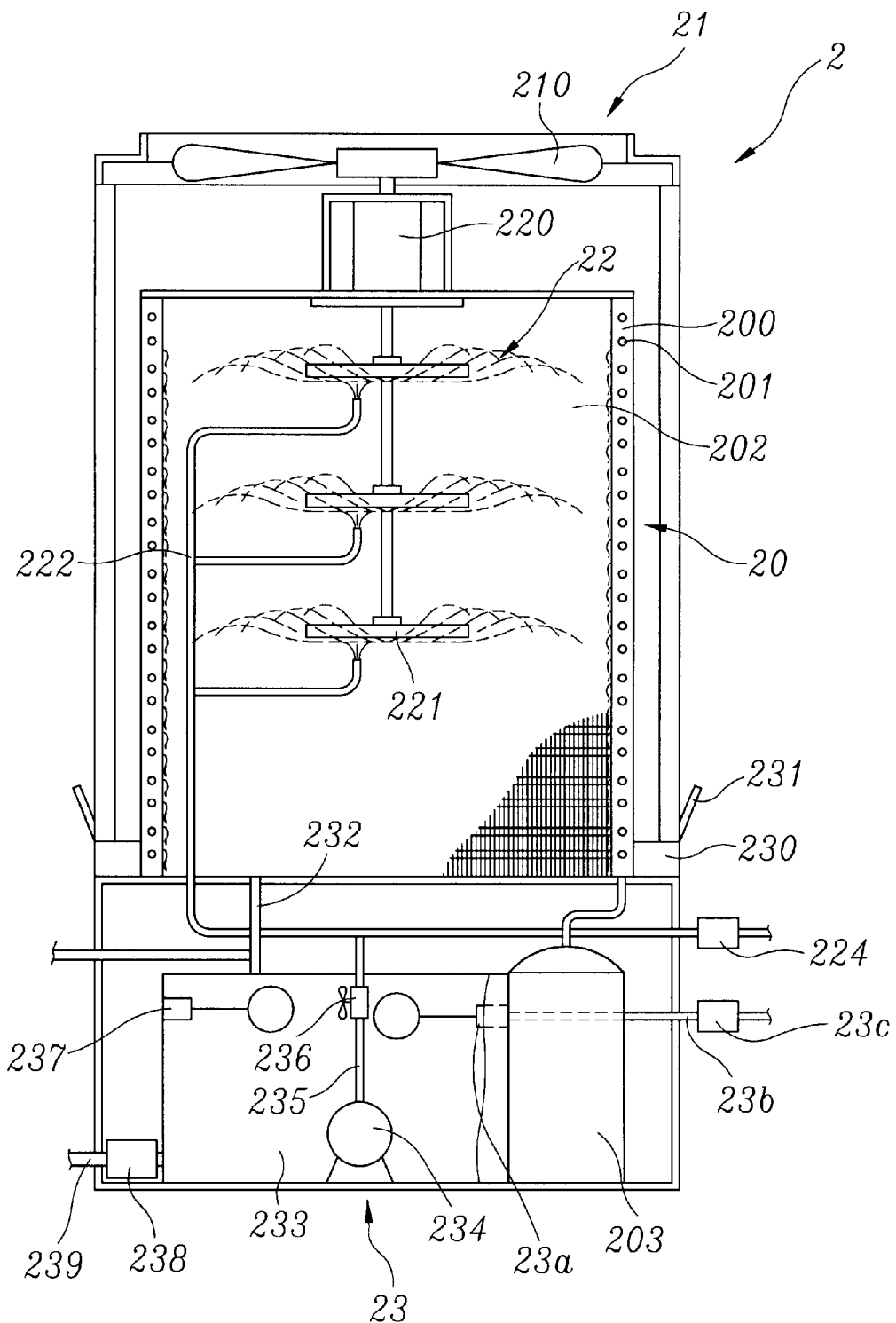
FIG. 8 is a structural schematic view showing another water spray way in the present invention.
Figure 9:
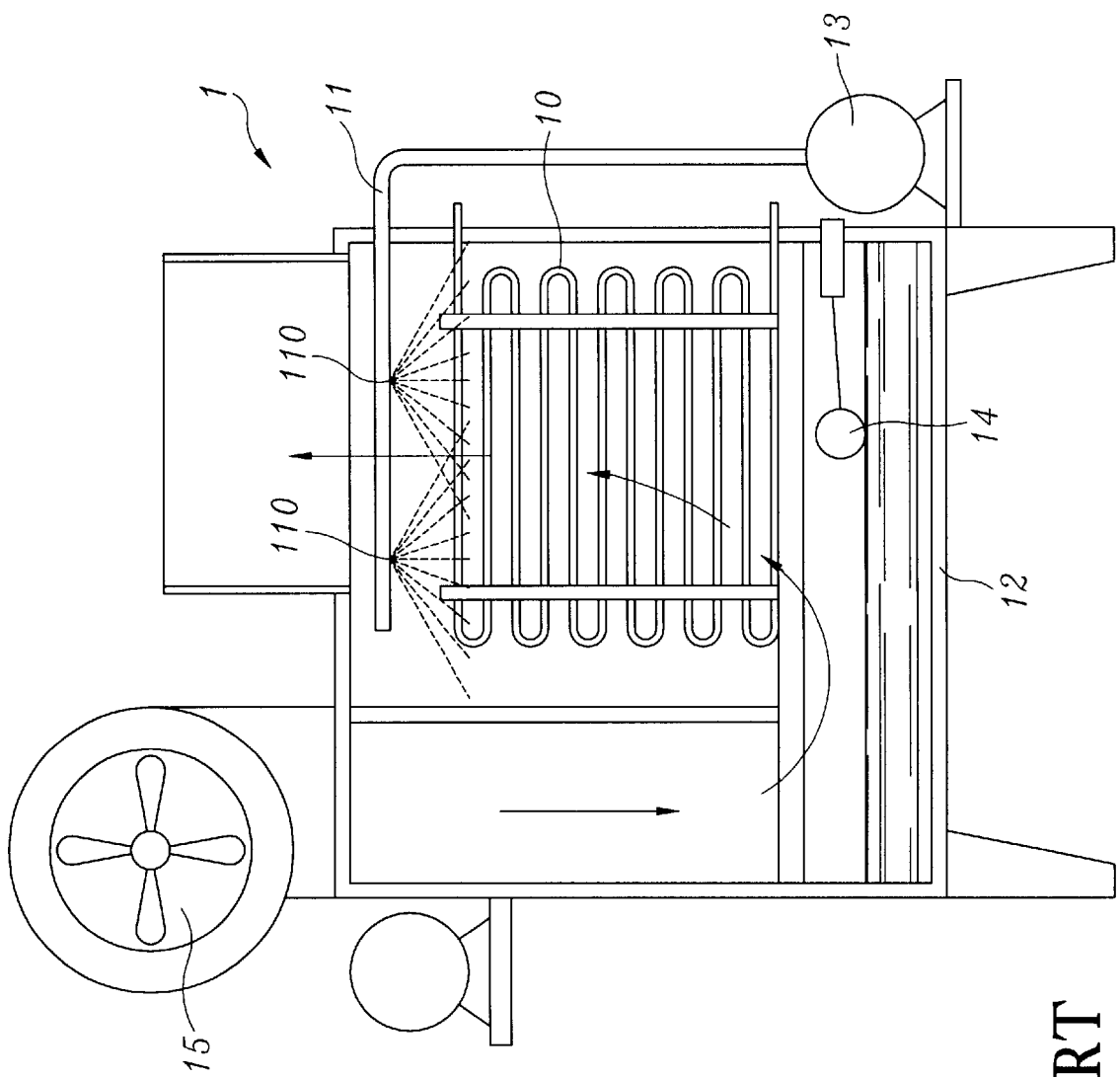
FIG. 9 is a structural schematic view of the cooling device in the present invention.

The water cooling unit 22 is installed in the hollow chamber 202 of the heat exchange unit 20. The water cooling unit 22 mainly includes at least one spray disk driven by a motor or other dynamic devices 220 and a first water supply tube 222 for supplying cooling water to the spray disk 221. The configuration of the spray disk 221 may be as that shown in FIG. 3 and 4, wherein a plurality of spiral or radiating shape trenches 223 extending inwards as shown in FIG. 3 and 4, or ribs 223' as shown in FIG. 7, or the cone shape as shown in FIGS. 5 and 6. Thereby, when the cooling water output from the first water supply tube 222 falls to (see FIG. 2) or sprays upwards (see FIG. 8) to a spray disk 221 rotating in a higher speed, the cooling water will uniformly spray to each heat radiating fin 200 and refrigerant tube 201 which are arranged on the periphery due to the inertial force of rotation itself and by the strong blowing of a gas cooling structure, and then flows downwards straightly along the upright heat radiating fin 200 so that the cooling water can sufficiently and completely contact with each heat radiating fins 200. Therefore, the cooling water may uniformly and rapidly absorb and exhaust the cooling heat of the refrigerant so that temperature is decreased quickly. Therefore, the cooling efficiency is improved greatly so as to save power.

Beside, the bottom of the heat exchange unit is installed with a water circulation unit 23. The water circulation unit 23 includes a water collecting disk 230 for collecting cooling water. The periphery of the disk is installed with a shield 231 which extends upward in inclined manner. The bottom of the disk is further installed with a water box 233 connected by a connection pipe 232. A water pump 234 is installed within the water box 233. A return pipe is connected between the water pump 234 and the first water supply 222 for guiding the cooling water within the water box 233 to be returned back to the first water supply tube 222. A switch vale 236 for selecting the way for supply water is installed on the return 235. Furthermore, a level switch 237 is installed in the water box 233 and the water draining pipe 239 having a water draining solenoid valve 238 is connected to be near the bottom thereof. When the water draining solenoid valve 238 is opened, the cooling waste water within the water box 233 can be drained out. Moreover, a float ball switch 23*a* is connected to a second water supply tube 23*b*. A second water supplying solenoid valve 23*c* is installed on the second water supply tube 23*b* for controlling the water supply. The opening or closing thereof can be controlled by the flowing ball switch 23*a*.

Therefore, the water supply ways of the present invention can be divided as a pump circulation mode and directly supplying mode. When the pump is switched to the pump circulation mode, the second solenoid valve 23*c* will be opened so that the second water supply tube 23*b* is actuated to be filled with water to the water box 233. When the level is attained to a set value. The float ball switch 23*a* will be induced and is closed automatically so as to stop to fill water. When the level switch 237 senses that the level switch has attained to a preset level, the water pump 234 is actuated automatically to supply water. Then water is transferred to the spray disk 221 for spray water to the heat exchange unit 20. Finally, the cooling water flows downwards to be concentrated to the recycle pipe 232 in the water collecting disk 230. Therefore, the cooling water can be recycled for use again and again.

When wasted cooling water is to be drained out, it can be set through an electric control box or by manual operation so that the second solenoid valve 23*c* is closed, and the water draining solenoid valve 238 is opened automatically for achieving the function of renew the water therein. When the level is descended to a preset height, the water pump 238 will close automatically, the second solenoid valve 23*c* will be opened again, after the cooling water is filled to a preset level, the water pump 234 is operated for supplying water.

If the switching valve 236 is switched to a directly supply mode, the second solenoid valve 23*c* will be closed, and the first solenoid valve 224 and water draining solenoid valve 238 are opened. Under this mode, the cooling water will not be returned for use again.

Moreover, a further temperature switch can be installed in the aforesaid electric control box. It can be set to be stop to supply water as the temperature is lower than a preset temperature for achieving the needing of water saving and using hot gas. A timer can be installed in the electric control box for controlling the time of water supply, water draining and delaying the actuation time of air compressor.

In summary, the high efficiency cooling device in a cooling mechanism of the present invention substantially improves the cooling efficiency and reducing power supply.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A high efficiency cooling device in a cooling mechanism comprising:

a heat exchange unit being an upright round frame formed of a plurality of upright heat radiating fins and refrigerant tubes which are densely wound around these heat radiating fins; the round frame being enclosed with a hollow chamber;

a water cooling unit installed in the hollow chamber of the heat exchange unit; the water cooling unit mainly including at least one automatically driven spray disk and a first water supply tube for supplying cooling water to the spray disk, whereby, cooling water will uniformly spray to each heat radiating fin due to the inertial force of rotation itself, then flow downward along the heat radiating fin so as to achieve a high efficiency cooling effect.

2. The high efficiency cooling device in a cooling mechanism as claimed in claim 1, wherein the cooling device further includes a gas cooling unit installed above the hollow chamber of the heat exchange unit.

3. The high efficiency cooling device in a cooling mechanism as claimed in claim 2, wherein the gas cooling unit includes a heat dissipating fan.

4. The high efficiency cooling device in a cooling mechanism as claimed in claim 1, wherein a first water supply solenoid valve for control water supply is installed on the first water supply tube.

5. The high efficiency cooling device in a cooling mechanism as claimed in claim 1, wherein a plurality of trenches extending outwards are installed on a disk surface of the spray disk.

6. The high efficiency cooling device in a cooling mechanism as claimed in claim 1, wherein the disk surface of the spray disk is installed with a plurality of ribs extending outwards.

7. The high efficiency cooling device in a cooling mechanism as claimed in claim 1, wherein the cooling device further includes a water circulation unit for collecting the cooling waste water from the heat exchange unit and then the waste water is recycled to the first water supply tube.

8. The high efficiency cooling device in a cooling mechanism as claimed in claim 7, wherein the water cooling unit includes a water box installed at the bottom of the heat exchange unit; a water pump is installed in the water box; the water pump is connected to the first water supply tube having the first water supply solenoid valve by return pipes; and a switching valve is installed in the return pipe.

9. The high efficiency cooling device in a cooling mechanism as claimed in claim 8, wherein a level switch for sensing water level is further installed in the water box.

10. The high efficiency cooling device in a cooling mechanism as claimed in claim 8, wherein the water box is further installed with a water draining pipe near the bottom, and a water draining solenoid valve is installed on the water draining pipe.

11. The high efficiency cooling device in a cooling mechanism as claimed in claim 8, wherein the water box further includes a float ball switch for sensing the level, the float ball switch is driven to a second water supply solenoid valve for supplying cooling water to the water box.

12. The high efficiency cooling device in a cooling mechanism as claimed in claim 8, wherein a water collecting disk is further installed on the bottom of the heat exchange unit above the water box and a connecting pipe is installed between the water collecting disk and the water box.

13. The high efficiency cooling device in a cooling mechanism as claimed in claim 12, wherein the periphery of the water collecting disk is installed with an outwardly extending shield.

\* \* \* \* \*